US012566843B2

(12) United States Patent
Wang et al.

(10) Patent No.: US 12,566,843 B2
(45) Date of Patent: Mar. 3, 2026

(54) CET MECHANISM-BASED METHOD FOR PROTECTING INTEGRITY OF GENERAL-PURPOSE MEMORY

(71) Applicant: INSTITUTE OF COMPUTING TECHNOLOGY, CHINESE ACADEMY OF SCIENCES, Beijing (CN)

(72) Inventors: Zhe Wang, Beijing (CN); Chenggang Wu, Beijing (CN); Mengyao Xie, Beijing (CN)

(73) Assignee: INSTITUTE OF COMPUTING TECHNOLOGY, CHINESE ACADEMY OF SCIENCES, Beijing (CN)

( * ) Notice: Subject to any disclaimer, the term of this patent is extended or adjusted under 35 U.S.C. 154(b) by 177 days.

(21) Appl. No.: 18/713,110

(22) PCT Filed: Oct. 20, 2022

(86) PCT No.: PCT/CN2022/126374
§ 371 (c)(1),
(2) Date: May 23, 2024

(87) PCT Pub. No.: WO2023/093385
PCT Pub. Date: Jun. 1, 2023

(65) Prior Publication Data
US 2025/0036752 A1 Jan. 30, 2025

(30) Foreign Application Priority Data
Nov. 29, 2021 (CN) .......................... 202111430587.6

(51) Int. Cl.
G06F 21/54 (2013.01)
G06F 21/55 (2013.01)
G06F 21/79 (2013.01)

(52) U.S. Cl.
CPC ............ *G06F 21/54* (2013.01); *G06F 21/556* (2013.01); *G06F 21/79* (2013.01)

(58) Field of Classification Search
CPC ......... G06F 21/54; G06F 21/556; G06F 21/79
See application file for complete search history.

(56) References Cited

U.S. PATENT DOCUMENTS 10,579,457 B1    3/2020  White
2015/0100791 A1*  4/2015  Chen ................... G06F 21/6218
                                                   713/189
(Continued)

FOREIGN PATENT DOCUMENTS

CN      108363930 A    8/2018
CN      109359487 A    2/2019
(Continued)

OTHER PUBLICATIONS

Song, Chengyu; Moon, Hyungon; Alam, Monjur; Yun, Insu; Lee, Byoungyoung; Kim, Taesoo; "HDFI: Hardware-Assisted Data-Flow Isolation," IEEE Symposium on Security and Privacy (SP), May 22-26, 2016, San Jose, CA, USA, 17 pages.*
(Continued)

*Primary Examiner* — Victor Lesniewski
(74) *Attorney, Agent, or Firm* — Zhong Law, LLC

(57) ABSTRACT

A CET mechanism-based method for protecting the integrity of a general-purpose memory. In the method, the integrity of the general-purpose memory is protected on the basis of a CET mechanism. A dedicated shadow stack page is provided, and is independent of the shadow stack page maintained by the CET mechanism itself, and overhead reduction processing adaptive to content to be written that is written to the dedicated shadow stack page and requires writing overhead reduction is performed on the content to be written, so as to reduce the number of times of using WRSS instructions, such that the integrity of sensitive data and/or sensitive (Continued)

codes is protected in the case of using lower overhead, and performance overhead of a processor in the protection of the integrity of the general-purpose memory is reduced, thereby improving the efficiency of processing other tasks by the processor.

12 Claims, 3 Drawing Sheets

(56) References Cited

U.S. PATENT DOCUMENTS

| | | | | |
|---|---|---|---|---|
| 2019/0042760 A1* | 2/2019 | Gutson | | G06F 21/54 |
| 2020/0073821 A1* | 3/2020 | Wallach | | G06F 21/53 |
| 2021/0109684 A1 | 4/2021 | Shanbhogue et al. | | |
| 2021/0218547 A1* | 7/2021 | Weiler | | H04L 9/0618 |
| 2021/0311740 A1* | 10/2021 | Lin | | G06F 9/3851 |
| 2022/0012188 A1* | 1/2022 | Durham | | G06F 21/79 |
| 2023/0091941 A1* | 3/2023 | Kipnis | | G06F 21/54 |
| | | | | 726/22 |
| 2023/0376252 A1* | 11/2023 | Shanbhogue | | G06F 12/0811 |

FOREIGN PATENT DOCUMENTS

| | | |
|---|---|---|
| CN | 109643345 A | 4/2019 |
| CN | 112256357 A | 1/2021 |
| CN | 112579988 A | 3/2021 |
| CN | 114266036 A | 4/2022 |

OTHER PUBLICATIONS

Burow, Nathan; Zhang, Xinping; Payer, Mathias; "SoK: Shining Light on Shadow Stacks," IEEE Symposium on Security and Privacy (SP), May 19-23, 2019, San Francisco, CA, USA, pp. 985-999.*

Search Report received for Chinese Application No. 2021114305876, dated Dec. 2, 2025.

Xie et al., CETIS: Retrofitting Intel CET for Generic and Efficient Intra-process Memory Isolation, CCS '22: Proceedings of the 2022 ACM SIGSAC Conference on Computer and Communications Security, dated Nov. 7, 2022.

Written Opinion of the International Search Authority issued in PCT Application No. PCT/CN2022/126374, mailed Jan. 17, 2023, with translation, 7 pages.

International Search Report issued in PCT Application No. PCT/CN2022/126374, mailed Jan. 17, 2023 with translation, 6 pages.

* cited by examiner

| 000...000 | 000...000 |
|---|---|
| 01 | 0000000 | 0000000 | Value | a Code pointer 8 bytes

| 000...000 | 000...000 |
|---|---|
| 10 | Offset2 | Offset1 | Value | b Data pointer pointing to a small object, 8 bytes

| Offset2 | Offset1 |
|---|---|
| 11 | 0000000 | 0000000 | Value | c Data pointer pointing to a large object, 16 bytes

| 000...000 | 000...000 |
|---|---|
| 00 | 0000000 | 0000000 | Value | d Pointer is released, 8 bytes

CET MECHANISM-BASED METHOD FOR PROTECTING INTEGRITY OF GENERAL-PURPOSE MEMORY

CROSS-REFERENCE TO RELATED APPLICATIONS

This application is the U.S. National Phase under 35 U.S.C. § 371 of International Application PCT/CN2022/126374, filed Oct. 20, 2022, which claims priority to Chinese Patent Application No. 202111430587.6, filed Nov. 29, 2021. The disclosures of the above described applications are hereby incorporated by reference in their entirety.

TECHNICAL FIELD

The present disclosure relates to the field of computer information security, specifically to the field of software security, and more specifically to a CET mechanism-based method for protecting the integrity of a general-purpose memory.

BACKGROUND

With the rapid development of informatization and the widespread adoption of computers, computers have been widely used in various aspects of society, including military, education, finance, and scientific research. Meanwhile, computer security issues emerge continuously, causing serious threats to national security, economy, etc. For example, the Code Red virus outbreak in July 2001 launched massive attacks on numerous servers, and the attacked servers sent large amounts of data to government websites according to instructions of the virus, ultimately leading to website paralysis and causing global losses of $2.6 billion. From Jan. 1, 2020 to the present, the Microsoft Security Response Center (MSRC) has reported a total of 37964 bugs (Bug) of which 5,264 were classified as high-severity. Another report from MSRC indicated that 70% of the newly disclosed bugs each year in the CVE (Common Vulnerability & Exposure) dictionary are related to memory security issues.

Among the memory security issues, corrupting the integrity of a sensitive memory (including sensitive data and sensitive code) poses a significant threat to system security.

The premise of enabling many defense mechanisms against memory corruption attacks to work normally is to ensure the integrity of sensitive data, such as a safe region and a safe stack of a CPI (Code Pointer Integrity) mechanism, a shadow stack of a shadow stack defense mechanism, and metadata of a defense mechanism CFIXX that ensures the integrity of object types in C++. A write XOR execute (Write XOR Execute, W^X) mechanism, which resists code injection attacks, prevents memory pages from having both write and execute permissions. However, dynamic code generation technologies widely used in just-in-time (JIT) compilers and dynamic binary translation will dynamically generate and modify code, and store the code in a code cache. Because sensitive code is located in the code cache, the integrity of the code cache needs to be protected.

The in-process isolation mechanism is an important means to guarantee system security. It ensures that even if attackers break through user processes, they cannot execute sensitive code or access sensitive data. In-process isolation-based methods are currently the mainstream research direction in the academic community. There are three types of in-process isolation methods, including an address-based isolation method, a domain-based isolation method, and a privileged access-based isolation method. Each is described as follows:

1. Address-based isolation method. The address-based isolation method requires instrumentation of each memory access instruction to constrain a range of addresses that these instructions can access, to ensure that safe regions cannot be accessed. In a technical solution of a software-only address isolation method such as SFI (Software Fault Isolation), code and data are divided into different regions, and the code in each region can only access its corresponding data. Because the SFI is implemented by the software-only method, it will incur huge performance overhead for memory access-intensive programs. To accelerate the address isolation method, the MPX (Memory Protection Extensions) is launched by Intel to accelerate bound checking. The MPX allows programmers to create a group of bounds to identify the upper and lower bounds of an address range. Whether a memory access address falls within a safe region is checked by instrumentation of all memory access instructions by means of the MPX hardware. Because the address-based isolation method checks whether each memory access instruction accesses key data before execution, protecting memory access intensive programs will incur huge performance overhead, and its performance bottleneck also lies in this.

2. Domain-based isolation method. The basic idea of the domain-based isolation method is to open access permission to a safe region before accessing the safe region and immediately close the access permission after the access is completed. In this way, even if attackers know the location of the safe region, they cannot access key data. The key data protected by information-hiding technology is generally frequently accessed by defense mechanisms, such as code pointer integrity technology, control flow integrity technology, and shadow stack technology. These defense mechanisms access the safe region during function returns, function calls, and indirect control flow jumps. Taking a SPEC CPU2006 benchmark test set as an example, the average execution frequency of function call and function return instructions is about 58 million times per second, and the average execution frequency of indirect jump instructions is about 43 million times per second. Therefore, the performance bottleneck of the domain isolation method is the frequent switching of access permission. A software-only domain isolation method modifies its access permission by using, for example, Mprotect system calls before and after accessing a safe region. Because a switch between user and kernel states for approximately 20000 clock cycles is required to execute a system call, frequent switching of the access permission will incur huge performance overhead.

In order to accelerate the domain-based isolation method and improve the speed of switching the access permission, some researchers have proposed using EPT (Extended Page Table) technology in hardware-assisted memory virtualization to isolate safe regions. In this method, two extended page tables (EPTs) are set, one recording an address mapping relationship for safe regions (referred to as a secure EPT), and the other recording an address mapping relationship for non-safe regions (referred to as a non-secure EPT). Then, the instruction provided by Intel, vmfunc, is utilized for quick switching between the two EPTs to achieve the purpose of isolation (approximately 140 clock cycles). Alternatively, Intel memory protection keys (MPKs) may be utilized to isolate safe regions. A user memory space can be divided into 16 regions by MPKs, a region to which a page belongs is identified by 4 bits in page table entries, and a PKRU register is added to control read and write permissions of each region, so as to achieve the purpose of isolation.

> 3. Privileged access-based isolation method. Some research shows that protection of safe regions can be achieved by adding a new hardware in a processor. For example, some researchers add a new one bit in a page table entry to identify whether the page is a sensitive data page, and extend the X86 instruction set to provide a dedicated memory access instruction, smov, to access the sensitive data page (i.e., the IMIX mechanism). Similarly, the MicroStache mechanism also uses a design idea similar to the IMIX mechanism, but makes further isolation on the cache to block potential cache-based side channel attacks. The IMIX mechanism and the MicroStache mechanism only need to set the page where the safe region is located as a protected page, and then access the region through dedicated memory access instructions to protect the safe region.

In summary, based on existing work, the methods for memory isolation still have the problem of high-performance overhead, which has become an obstacle to their large-scale deployment. The method of adding hardware has the main problem of lacking real hardware support, so it cannot be immediately deployed to a system to protect the integrity and confidentiality of a safe region.

Due to the high-performance overhead of existing software implementation methods, in order to protect sensitive memories, Intel has launched a control-flow enforcement technology (CET), including a newly added hardware shadow stack mechanism, referred as CET-SHSTK or SHSTK, and a newly added hardware-implementation coarse-grained CFI (control flow Integrity) defense mechanism for forward edges (i.e., the IBT mechanism) in latest processors. The SHSTK mechanism is an important and effective defense mechanism to prevent ROP attacks, which can ensure that a return address on a stack cannot be tampered with by an attacker. When a program executes a Call instruction to push a return address into a main stack, the SHSTK mechanism also pushes a return address into a hardware shadow stack (located on a shadow stack page) pointed to by an SSP register. When the program executes a Ret instruction, the SHSTK mechanism compares the return addresses on the main stack and the hardware shadow stack and throws a #GP exception if the return addresses are inconsistent. Ordinary read instructions can read shadow stack pages, but ordinary write instructions cannot write shadow stack pages, otherwise an exception will be triggered. Only WRSS instructions can write shadow stack pages. The CET mechanism can effectively protect content in shadow stack pages, but the hardware shadow stack under the existing CET mechanism saves the return address, that is, the return address is saved without being tampered by attackers, and sensitive data or code is not protected. If the hardware shadow stack is directly used to protect sensitive data and sensitive code, it will conflict with the mechanism (saving the return address) of the hardware to fail in compatibility. In addition, if sensitive data and sensitive code are directly written into the existing shadow stack, the write overhead of the WRSS instructions is high, making the isolation overhead of existing technologies too high. Moreover, because the CET mechanism involves multiple aspects of tasks, it is difficult to directly adjust the CET mechanism to protect the sensitive data and sensitive code.

SUMMARY

The present disclosure aims to overcome the above shortcomings of the existing technologies and provide a CET mechanism-based method for protecting the integrity of a general-purpose memory.

The objective of the present disclosure is achieved through the following technical solution:

According to a first aspect of the present disclosure, a CET mechanism-based method for protecting the integrity of a general-purpose memory is provided. The method comprises: S1. setting a page where sensitive data and/or sensitive code that need to be protected are located as a dedicated shadow stack page when a program is executed, where the dedicated shadow stack page is independent of a shadow stack page maintained by a CET mechanism itself; S2. writing content to be written into the dedicated shadow stack page through a WRSS instruction of the CET mechanism; and S3. protecting the integrity of the sensitive data and/or sensitive code by using the dedicated shadow stack page.

Preferably, in step S2, when the data volume of the content to be written is greater than a predetermined threshold, overhead reduction processing is performed on the content to be written before the content to be written is written into the dedicated shadow stack page through the WRSS instruction of the CET mechanism; or when the data volume of the content to be written is less than or equal to the predetermined threshold, a reserved register is used to temporarily save the content to be written until the total data volume of the content to be written in the reserved register is equal to the predetermined threshold, and then the data in the reserved register is written into the dedicated shadow stack page through the WRSS instruction. In some embodiments of the present disclosure, lossless compression of the content to be written is performed to implement the overhead reduction processing. Preferably, the predetermined threshold is 8 bytes or 4 bytes.

In some embodiments of the present disclosure, the content to be written comprises metadata of a sensitive pointer, and the metadata of the sensitive pointer comprises a value of the sensitive pointer and upper and lower bounds of an object pointed to by the sensitive pointer; and steps of performing lossless compression on the content to be written that has the data volume greater than the predetermined threshold and includes the metadata of the sensitive pointer comprise: calculating a first difference and a second difference according to the metadata of the sensitive pointer, where the first difference is a difference obtained by subtracting the lower bound of the object pointed to by the sensitive pointer from the value of the sensitive pointer, and the second difference is a difference obtained by subtracting the value of the sensitive pointer from the upper bound of the object pointed to by the sensitive pointer; and saving the value of the sensitive pointer, the first difference, and the second difference by using a plurality of bits that are not used by an addressing process and a plurality of bits that are used by the addressing process in an address space. Preferably, in step S2, when the content to be written comprises the metadata of the sensitive pointer and its data volume is greater than the predetermined threshold, after the overhead reduction processing on the content to be written, the content to be written is written into the dedicated shadow stack page by using the WRSS instruction of the CET mechanism in the following way: writing the value of the sensitive pointer, the first difference, and the second difference into specified bits in the dedicated shadow stack page based on the class of the sensitive pointer and a data writing rule corresponding to the class, and using the corresponding bits that are not used by the addressing process in the address space as extend class indicator bits for recording the class of the sensitive pointer.

In some embodiments of the present disclosure, the content to be written comprises a metadata table for backing up a virtual table pointer.

In some embodiments of the present disclosure, the content to be written is machine code generated by a JIT compiler, and the machine code is sensitive code.

Preferably, in step S3, before a corresponding pointer saved in an ordinary memory is dereferenced, whether the dereference is secure is determined according to the metadata of the sensitive pointer backed up from the pointer and stored in the dedicated shadow stack page; or before a target function is directly called according to a corresponding virtual table pointer saved in an ordinary memory, the virtual table pointer is compared with the virtual table pointer recorded in the metadata table in the dedicated shadow stack page to determine whether the indirect call is secure.

The present disclosure may further be implemented through the following technical solution:

According to a second aspect of the present disclosure, an Intel CET mechanism-based method for protecting the integrity of a general-purpose memory is provided, including: setting a page where sensitive data and/or sensitive code that need to be protected are located as a dedicated shadow stack page when a program is executed, where the dedicated shadow stack page is independent of a shadow stack page maintained by a CET mechanism itself; performing adapted overhead reduction processing on content to be written that needs to reduce write overhead before a write operation is performed on the dedicated shadow stack page; writing the content to be written after the overhead reduction processing into the dedicated shadow stack page through a WRSS instruction of the CET mechanism; and protecting the integrity of the sensitive data and/or sensitive code by using the dedicated shadow stack page.

In some embodiments of the present disclosure, the step of performing adapted overhead reduction processing on content to be written that needs to reduce write overhead comprises: performing lossless compression processing on the content to be written when the data volume of the content to be written is greater than a predetermined threshold, where a plurality of bits that are not used by an addressing process in an address space are used to reduce the memory size actually occupied by the content to be written.

In some embodiments of the present disclosure, the content to be written that needs to reduce write overhead comprises metadata of a sensitive pointer, and the metadata of the sensitive pointer comprises a value of the sensitive pointer and upper and lower bounds of an object pointed to by the sensitive pointer; and the step of performing lossless compression on the content to be written comprises: calculating a first difference and a second difference according to the metadata of the sensitive pointer, where the first difference is a difference obtained by subtracting the lower bound of the object pointed to by the sensitive pointer from the value of the sensitive pointer, and the second difference is a difference obtained by subtracting the value of the sensitive pointer from the upper bound of the object pointed to by the sensitive pointer; and saving the value of the sensitive pointer, the first difference, and the second difference by using the plurality of bits that are not used by the addressing process and a plurality of bits that are used by the addressing process in the address space.

In some embodiments of the present disclosure, the step of writing the content to be written after the overhead reduction processing into the dedicated shadow stack page through a WRSS instruction of the CET mechanism comprises: writing the value of the sensitive pointer, the first difference, and the second difference into specified bits in the dedicated shadow stack page according to the class of the sensitive pointer and a data writing rule corresponding to the class, and using the corresponding bits that are not used by the addressing process in the address space as extend class indicator bits for recording the class of the sensitive pointer.

In some embodiments of the present disclosure, the step of protecting the integrity of the sensitive data and/or sensitive code by using the dedicated shadow stack page further comprises: before dereferencing a corresponding pointer saved in an ordinary memory, determining whether the dereference is secure according to the metadata of the sensitive pointer backed up from the pointer and stored in the dedicated shadow stack page.

In some embodiments of the present disclosure, the method further comprises: directly writing the content to be written that does not need to reduce write overhead into the dedicated shadow stack page through the WRSS instruction of the CET mechanism.

In some embodiments of the present disclosure, the content to be written that does not need to reduce write overhead comprises a metadata table for recording a virtual table pointer; and the step of protecting the integrity of the sensitive data and/or sensitive code by using the dedicated shadow stack page further comprises: before directly calling a target function according to a corresponding virtual table pointer saved in an ordinary memory, comparing the virtual table pointer with the virtual table pointer recorded in the metadata table in the dedicated shadow stack page to determine whether the indirect call is secure.

In some embodiments of the present disclosure, the step of performing adapted overhead reduction processing on content to be written that needs to reduce write overhead before a write operation is performed on the dedicated shadow stack page comprises: when the data volume of the content to be written is less than the predetermined threshold, occupying a reserved register to temporarily save the content to be written and waiting for saving of other content to be written that has a data volume less than the predetermined threshold until the total data volume of the content to be written in the reserved register is greater than or equal to the predetermined threshold, and then performing write through the WRSS instruction.

In some embodiments of the present disclosure, the content to be written comprises machine code generated by a JIT compiler, and the machine code is sensitive code; and the step of performing adapted overhead reduction processing on content to be written that needs to reduce write overhead before a write operation is performed on the dedicated shadow stack page comprises: storing the corresponding machine code in the reserved register in the generated order until the total data volume of the content to be written reaches the predetermined threshold, and then performing write through the WRSS instruction.

Further, according to a third aspect of the present disclosure, the present disclosure provides a CET mechanism-based method for protecting the security of a program. The method comprises: obtaining program source code; and compiling the program source code by using a compiler to protect the integrity of sensitive data and/or sensitive code according to one of the methods described in the first aspect and the second aspect when the program is executed. Preferably, the step of compiling the program source code by using a compiler comprises: inserting corresponding protection logic code according to information about sensitive data and/or sensitive code that needs to be protected in the program source code, so as to protect the integrity of the sensitive data and/or sensitive code through the corresponding protection logic code according to the method according to a first aspect of the present disclosure when the compiled program is executed.

According to a fourth aspect of the present disclosure, an electronic device is provided, including: one or more processors; and a memory, where the memory is configured to store executable instructions; where the one or more processors are configured to implement the method in the first aspect, the second aspect and/or the third aspect by executing the executable instructions.

Compared with existing technologies, the present disclosure has the following advantages: the shadow stack page function in the CET mechanism is fully utilized to provide a dedicated shadow stack page for sensitive data and/or sensitive code that is independent of existing shadow stack pages of hardware; in a writable mechanism through the WRSS instruction, the characteristic of low memory access overhead of the CET mechanism is fully utilized to effectively protect sensitive data and/or sensitive code and ensure the integrity of the memory; and in the process of writing into the shadow stack through the WRSS instruction, the overhead reduction processing on the content that has a data volume greater than a threshold further improves memory access efficiency.

BRIEF DESCRIPTION OF THE DRAWINGS

The following further illustrates the embodiments of the present disclosure with reference to the accompanying drawings.

DETAILED DESCRIPTION

In order to make the objectives, technical solutions and advantages of the present disclosure clearer, the present disclosure will be further described in detail below in conjunction with the accompanying drawing through specific embodiments. It should be understood that the specific embodiments described herein are merely used for interpreting the present disclosure, rather than limiting the present disclosure.

As mentioned in the background, the write overhead of the WRSS instructions is high, making the isolation overhead of existing technologies too high. Moreover, because the CET mechanism involves multiple aspects of tasks, it is difficult to directly adjust the CET mechanism. Therefore, the present disclosure protects the integrity of a general-purpose memory on the basis of an Intel CET mechanism. In order to be compatible with the Intel CET mechanism and not to conflict with a shadow stack page maintained by the Intel CET mechanism itself, a dedicated shadow stack page is provided in the present disclosure, and is independent of the shadow stack page maintained by the Intel CET mechanism itself, and content to be written that has a data volume more than a threshold is written to the dedicated shadow stack page after overhead reduction processing, so as to reduce the number of times of using WRSS instructions. Thus, the integrity of sensitive data and/or sensitive code is protected in the case of using lower overhead, and the performance overhead of a processor for the protection of the integrity of the general-purpose memory is reduced, thereby improving the efficiency of processing other tasks by the processor.

Figure 1:
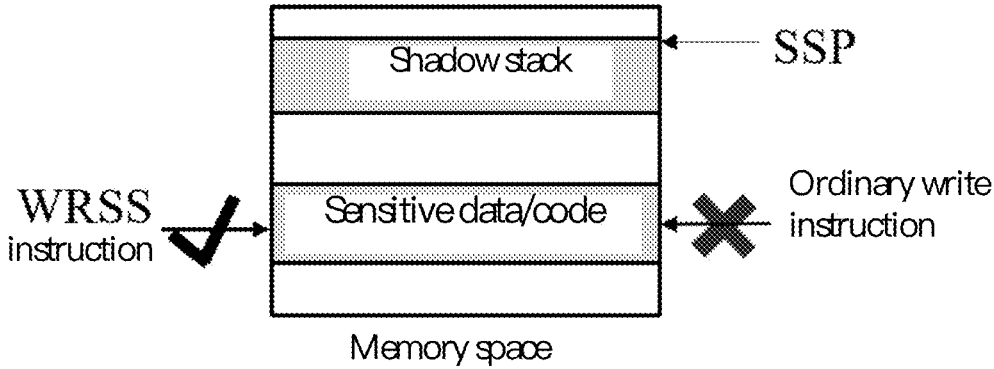
FIG. 1 is a schematic diagram of a shadow stack page/ dedicated shadow stack page where a write operation is performed through a WRSS instruction and cannot be performed by an ordinary write instruction according to an embodiment of the present disclosure.

Before the embodiments of the present disclosure are specifically introduced, some of the terms used therein are first explained as follows:

The WRSS instructions are instructions that can modify the content of shadow stack pages in Intel CET technology. The Intel CET technology can maintain a shadow stack in memory space for a corresponding thread (the thread that needs to be protected). With reference to the memory space shown in FIG. 1, a base address of the shadow stack is saved in an SSP (Shadow Stack Pointer) register. The shadow stack is composed of shadow stack pages. Ordinary write instructions do not have write permissions to shadow stack pages, while the WRSS instructions have write permissions to shadow stack pages. Compared with ordinary memory access instructions, the time overhead for a single write of a WRSS instruction to a memory is very high. Specifically, the execution of a "mov" instruction only requires less than 1 clock cycle, while a WRSS instruction requires approximately 12 clock cycles. The WRSS instructions comprise WRSSQ instructions (writing 8-byte content at a time) and WRSSD instructions (writing 4-byte content at a time). The WRSSQ instruction writes 8-byte content from a source register to a destination shadow stack page, and the destination address must be 8-byte aligned. The WRSSD instruction writes 4-byte content from a source register to a destination shadow stack page, and the destination address must be 4-byte aligned. The overhead for writing 4 bytes by the WRSSD instruction is equivalent to the overhead for writing 8 bytes by the WRSSQ instruction. In contrast, the WRSSQ instruction is more efficient. Therefore, the WRSSQ instruction is used as an example in the following specific embodiments. However, those skilled in the art may alternatively use WRSSD instructions in some cases and make corresponding adjustments to implement the present disclosure.

Pointer dereference refers to reference a value of an object that a pointer points to. For example, it involves referencing the value of a variable stored at a particular address.

According to an embodiment of the present disclosure, in order to be compatible and avoid conflicts, a dedicated shadow stack page is provided in the present disclosure to protect sensitive data and/or sensitive code besides a shadow stack page maintained by an Intel CET mechanism (also referred to as a CET mechanism in some places) (the term "dedicated" is used to distinguish from the shadow stack page maintained by the Intel CET mechanism itself, and the dedicated shadow stack page is also a shadow stack page). The WRSS instructions can perform a write operation on both the shadow stack page maintained by the Intel CET mechanism and the dedicated shadow stack page. In order to reduce write overhead, different content to be written is distinguished and corresponding write processing is performed as follows:

If the volume of data that needs to be updated each time is large, exceeding a predetermined threshold (such as greater than 8 bytes), the data is split into a plurality of 8 bytes and written to the dedicated shadow stack page through a plurality of WRSSQ instructions. In order to improve execution efficiency, CETIS analyzes features of the data to be updated and performs lossless compression on the data to reduce the number of times of executing the WRSSQ instructions for a single update.

If the volume of data that needs to be updated each time is small, less than the predetermined threshold (such as less than 8 bytes), WRSSQ instructions may be executed frequently, which will incur significant performance overhead. To solve this problem, an XMM register will be reserved in the present disclosure to cache data to be updated that is less than 8 bytes. Only when the content in the register reaches 8 bytes, the data in the register is written to the dedicated shadow stack page by using WRSSQ instructions.

It should be noted that the predetermined threshold is related to the selected write instructions. For example, for WRSSQ instructions, the threshold is 8 bytes, while for WRSSD instructions, the threshold is 4 bytes. In the embodiments of the present disclosure, the implementation process of the present disclosure is illustrated using the WRSSQ instructions and the threshold of 8 bytes as an example. The situation using the WRSSD instructions and the threshold of 4 bytes is similar.

According to an embodiment of the present disclosure, if an implementer writes a new program, the implementer can write protection logic for specific sensitive data and/or sensitive code in the program according to the solution of the present disclosure during programming, so as to achieve a low-overhead protection mechanism through a dedicated shadow stack page.

According to an embodiment of the present disclosure, if an implementer has written a program, but the program does not protect sensitive data and/or code through a shadow stack page, the implementer can change the protection logic of the original protection mechanism in the program to the protection logic of the present disclosure according to preset adjustment logic through a compiler when optimizing the program, so as to save time and effort. In order to provide a more intuitive understanding of the present disclosure, the following embodiments are mainly explained from the perspective of adjusting the protection logic of the original protection mechanism in the program through a compiler.

However, it should be understood that the following embodiments are only illustrative, and many other implementations in the art will not be listed one by one in the present application.

For protecting the integrity of a general-purpose memory, it mainly comprises two aspects: protecting sensitive data and protecting sensitive code. The following will explain the technical solution of the present disclosure from the two aspects:

1. Protecting Sensitive Data

In an embodiment of protecting sensitive data, an LLVM (Low Level Virtual Machine) compiler is used as an example to illustrate the process of adjusting the original protection mechanism in the program to the protection mechanism of the present disclosure through the LLVM compiler. The LLVM compiler (framework) is a collection of modular, reusable compilers and tool chain technologies. Most of the logic of the LLVM compiler focuses on compiler optimization and code generation. These functions are composed of one or more intermediate optimization processes (namely, Pass, some literature refers to "one Pass" as "one trip"). In order to adjust the original protection mechanism, the LLVM compiler may be used as an underlying framework. By adding a CETIS (CET-based memory Isolation Technology, an abbreviation of the protection mechanism of the present disclosure) Pass to the middle end of the LLVM compiler, sensitive data can be protected, thereby preventing attackers from damaging the integrity of sensitive data. The following takes a CFIXX defense mechanism and a CPI mechanism as an example to exhibit how the CETIS mechanism of the present disclosure is combined with these defense mechanisms to protect the integrity of a memory with low overhead.

(1) Protecting sensitive data in the CFIXX defense mechanism is taken as an example to explain the situation where content to be written does not exceed 8 Bytes (that is, content to be written does not need to reduce write overhead)

C++ is a programming language evolved from the C language. C++ can perform procedural programming of the C language, object-oriented programming characterized by abstract data types, and object-oriented programming characterized by inheritance and polymorphism. Dynamic allocation implemented through virtual tables is the core of polymorphism in C++, so that subclasses can rewrite virtual functions inherited from a parent class. In C++, each polymorphic class has one or more virtual tables. The virtual table comprises function pointers of all virtual functions of that class. The virtual table is indexed by a first domain virtual table pointer of a class object, and virtual table pointers are initialized in a constructor of the class object. An underlying type of the object is identified by the virtual table pointers in the dynamic allocation process. At each virtual function call point, the program first finds a target virtual function pointer in a virtual table through a virtual table pointer of an object class, and then executes a target function through indirect calls. The virtual table is located in a read-only memory region (Rodata segment), while the virtual table pointer is stored in a readable and writable memory region. Therefore, if an attacker uses a program bug to tamper with the virtual table pointer, the attacker can launch a control flow hijack attack, such as a COOP (Counterfeit Object Oriented Programming) attack.

To resist the above attack, it is necessary to ensure the OTI (Object Type Integrity) of the C++ program, that is, to ensure the integrity of the virtual table pointer. The CFIXX defense mechanism ensures that virtual table pointers of objects are not tampered with by attackers at runtime. Specifically, by modifying the LLVM compiler, the program saves the backup of virtual table pointers in a metadata table at runtime, and ensures the integrity of the metadata table through an address isolation method. However, as described in the background, the solution based on address isolation in the existing technologies to protect the integrity of the metadata table incurs high memory access performance overhead due to the judgment required for each instruction. In order to solve the problem, according to an embodiment of the present disclosure, based on the CFIXX defense mechanism, an intermediate optimization process (Pass, also known as "one trip" in some literature) is added to the LLVM compiler. The intermediate optimization process generates logic protected by a dedicated shadow stack page according to the protection logic in the original CFIXX defense mechanism. By modifying allocation and saving portions of the metadata table used for backing up virtual table pointers in the C++ program, the storage location of the metadata table is set as the dedicated shadow stack page and modified as using WRSSQ instructions to write the virtual table pointers to the metadata table at the dedicated shadow stack page, and the protection logic in the original CFIXX defense mechanism is discarded (for example, by deleting implementation code of the original CFIXX defense mechanism). The original CFIXX defense mechanism writes an 8-byte virtual table pointer to the metadata table each time, so the content to be written here (virtual table pointer) can be directly written to the dedicated shadow stack page by using the WRSSQ instruction of the CET mechanism. During program execution, before the target function is indirectly called according to a corresponding virtual table pointer saved in an ordinary memory, the virtual table pointer in the ordinary memory is compared with the virtual table pointer recorded in the metadata table in the dedicated shadow stack page. If they are consistent, the indirect call is secure and the execution continues. If they are inconsistent, the indirect call is insecure, an exception is thrown and the execution stops. After adjustment, the defense mechanism of the present disclosure can be used to implement the protection function of the original CFIXX defense mechanism, but the overhead for implementing the defense mechanism of the present disclosure during program execution after adjustment is lower.

(2) The code pointer integrity (CPI) mechanism is also a mechanism to ensure the integrity of sensitive data. The following explains how the present disclosure protects CPI and the situation where the content to be written exceeds 8 bytes (that is, the content to be written needs to reduce write overhead).

Figure 2:
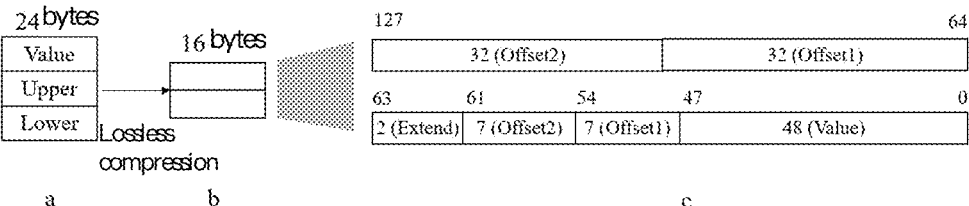
FIG. 2 shows a data structure after overhead reduction processing/lossless compression processing on an original data structure of metadata of a sensitive pointer according to an embodiment of the present disclosure.

The CPI mechanism aims to protect the integrity of sensitive pointers and prevent attackers from tampering with sensitive pointers, thereby preventing the launch of control flow hijack attacks. In CPI, definitions of sensitive pointers are recursive, including all code pointers (such as function pointers and return addresses) and pointers that can be used for accessing sensitive pointers. Sensitive data in CPI is divided into two portions. One portion involves a safe stack, which is used for storing values of return addresses and objects that can be proven to be safe through static analysis. Unsafe objects are stored in an unsafe stack. In the implementation of CPI, a main stack of the program is set as the safe stack. The other portion involves a safe pointer store, which is used for storing metadata of sensitive pointers except the return addresses. As shown in FIG. 2a, the metadata comprises a value of a sensitive pointer and the upper and lower bounds of an object pointed to by the sensitive pointer. Before the pointer is dereferenced, whether the dereference is secure is determined according to the metadata of a sensitive pointer in the safe pointer store (that is, whether a code pointer is tampered with or whether an access target of a data pointer is out of bounds is determined). However, as described in the background, the solution based on domain isolation to protect code pointer integrity incurs huge memory access performance overhead due to switching of a memory access permission. To solve this problem, according to an embodiment of the present disclosure, the LLVM compiler is modified and the CET mechanism is used instead of the safe stack to protect return addresses in the program from being tampered; and the page where the safe pointer store is located is set as a dedicated shadow stack page, that is, metadata of sensitive pointers is stored in the dedicated shadow stack page. Taking an X86_64 processor as an example, the metadata (value, upper, lower) of each sensitive pointer is 24 bytes. The sensitive pointer is written to the dedicated shadow stack page 3 times by directly using WRSSQ instructions, which increases the performance overhead of isolation. In the existing technologies, 48-63 bits in an 8-byte address space are not used by an addressing process. Therefore, the present disclosure utilizes the bits that are not used by the addressing process and adopts a lossless compression of metadata to minimize the volume of data written to a sensitive memory each time. According to an embodiment of the present disclosure, as shown in FIG. 2b, 24 bytes are compressed to 16 bytes, and the compressed data structure (also known as Compress_val structure) is shown in FIG. 2c. The current X86_64 processor can index a $2^{48}$-byte address space, low 48 bits of pointers in a user space pointer are valid, and high 16 bits are all 0, so the low 48 bits (0-47 bits) in the Compress_val structure are used for storing the values of sensitive pointers, while the remaining bits are mainly used for storing a first difference Offset1 (48-54 bits) and a second difference Offset2 (55-61 bits). The value of the first difference offset1 is equal to the value of a sensitive pointer minus the lower bound of an object pointed to by the sensitive pointer, and the value of the second difference offset2 is equal to the upper bound of an object pointed to by a sensitive pointer minus the value of the sensitive pointer. In the present disclosure, the object greater than or equal to 128 bytes is referred to as a "large object", and the object less than 128 bytes is referred to as a "small object". Bits 62 to 63 of the Compress_val structure are Extend bits (i.e., extension class indicator bits) used for identifying the class of the sensitive pointer corresponding to the metadata: when Extend=1, it indicates that the sensitive pointer is a code pointer; when Extend=2, it indicates that the sensitive pointer is a data pointer pointing to a small object (Offset1 and Offset2 can both be encoded by 7 bits); when Extend=3, it indicates that the sensitive pointer is a data pointer pointing to a large object; and when Extend=0, it indicates that the sensitive pointer has been released.

According to an embodiment of the present disclosure, different classes of pointers may have different metadata compression strategies. FIG. 3a to FIG. 3d show schematic utilization solutions for address spaces under the compression strategies for metadata of 4 different classes of pointers, where gray regions are actually used regions. From FIG. 3a, it can be seen that if only the value of the code pointer needs to be stored (only 8 bytes are required), only some bits in a low 8-byte address are required, and only one write operation is performed by using a WRSSQ instruction after compression. In FIG. 3b, the data pointer pointing to a small object stores the value of the pointer and two Offsets. In the data pointer pointing to a small object, the maximum value of the first difference Offset1 or the second difference Offset2 occupies only 7 bits. As the Extend bit occupies only 2 bits, bits 48-61 in the low 8 bytes can store just two Offsets. Therefore, the data pointer pointing to a small object needs to use only 8 bytes, and only one write operation is performed by using a WRSSQ instruction after compression. In FIG. 3c, bits 48-61 of the data pointer pointing to a large object cannot store two Offsets, so additional 8 bytes are required to write the Offsets. Therefore, high 8 bytes of 16 bytes are used to store two Offsets (for example, bits 64-95 store Offset1, and bits 96-127 store Offset2), the original 24 bytes can be compressed to 16 bytes, and two write operations are performed by using WRSSQ instructions after compression. When the pointer is released, only the Extend position in the low 8 bytes is set to 0. It can be seen that under the above strategy of compressing metadata, only the data pointer pointing to a large object needs to be written in 16 bytes, and only 8 bytes need to be written in other cases, thereby minimizing the performance overhead of updating safe regions. During pointer dereference, the present disclosure decompresses metadata of the pointer according to the corresponding compression strategy and the Extend value, and then uses the original check logic of CPI to check whether the pointer is valid. That is, before a corresponding pointer saved in the ordinary memory is dereferenced, whether the dereference is secure is determined according to the metadata of the sensitive pointer backed up from the pointer and stored in the dedicated shadow stack page. If the dereference is insecure, an exception is thrown and the execution stops; and if the dereference is secure, the pointer is dereferenced.

2. Protecting the Integrity of Sensitive Code

In addition to protecting sensitive data, the present disclosure can also protect the integrity of sensitive code. The following illustrates the situation where the content to be written does not exceed 8 bytes (that is, content to be written does not need to reduce write overhead) by means of an embodiment of protecting the integrity of sensitive code.

Figures 3, 4:
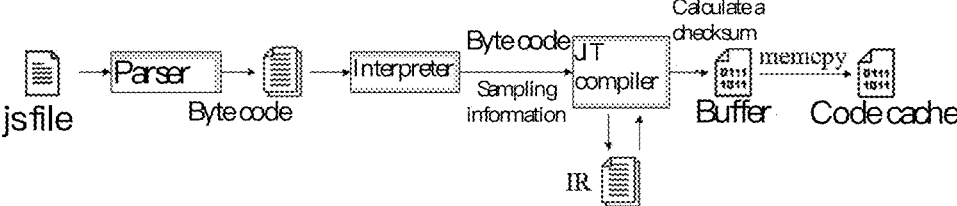
FIG. 3 shows data structures of metadata of 4 different types of sensitive pointers after overhead reduction processing/lossless compression processing according to an embodiment of the present disclosure.
FIG. 4 shows an execution process of interpreting and converting a js file into machine code by a JIT compiler in existing technologies.

The performance of a JavaScript engine is crucial for an entire browser, and JIT (Just-In-Time) compilation optimization is for improving the performance of the JavaScript engine. As shown in FIG. 4, a parser in the JS engine first parses an input js file into byte code, and an interpreter interprets the byte code for execution. When the same piece of script code is repeatedly executed in a loop statement, the efficiency will be low if the interpreter repeatedly executes the relevant byte code. The JIT compiler can directly generate machine instructions from source code and directly execute the machine instructions during the next execution. JIT compilation is enabled only when a target function or a loop statement is frequently called. After the JIT compilation, a corresponding machine instruction is generated and stored as native code (Native code) in a memory space. The memory space where the native code is stored is referred to as a code cache. Next time the statement or function is called, the machine code (or machine instruction) will be directly executed. Once JIT generation is completed, the program can directly call the machine code generated by JIT.

Figure 5:
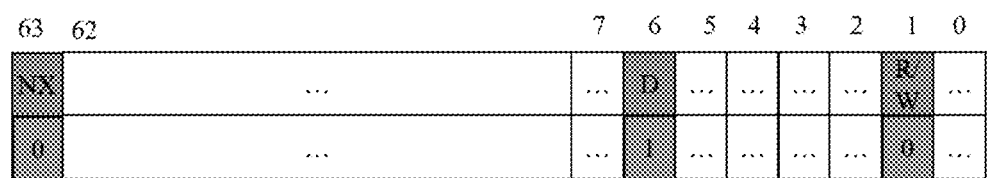
FIG. 5 is a schematic diagram of an NX position 0 in a code cache where sensitive code is protected by using a CET technology according to an embodiment of the present disclosure.

Byte code is interpreted and executed in a restricted virtual machine environment, while machine code in the code cache is directly executed by a local processor. Therefore, the JIT compiler limits the capability of an emitted code cache. For example, the JIT compiler does not emit potentially dangerous instructions such as system call instructions. Because the JIT compiler needs to write the generated machine code into the memory, the most direct method is to set the page where the machine code is located as a readable, writable, and executable page, such as the implementation of a JavaScriptCore engine under an Intel processor. However, the method breaks the W^X strategy, so that the code cache easily becomes a target for attackers. Therefore, some engines use domain isolation methods based on mprotect( ) system call to protect the code cache from being tampered with by attackers. That is, the code cache is first set to be readable and writable when emitting, and the permission of the code cache is set to be readable and executable after emitting, such as the implementation of a JavaScriptCore engine under an ARM processor and Chakra. In order to reduce performance overhead for frequently calling the mprotect( ) system, the JavaScript engine first stores the machine code generated by the JIT compiler in a buffer. After generation, the machine code in the buffer is copied to the code cache at a time by using a memory copy function memcpy( ). However, the memory access overhead is still high. To solve this problem, for some sensitive code, a dedicated shadow stack page may be set in the present disclosure for protection, without storing the sensitive code in the ordinary memory. Only the page storing the sensitive code needs to be set as an executable dedicated shadow stack page, thereby achieving the purpose of protection and reducing the memory access overhead. According to an embodiment of the present disclosure, a code cache where sensitive code is located is protected using Intel CET technology in the present disclosure, and an NX bit in a page table entry corresponding to the dedicated shadow stack page storing the sensitive code is set to 0, so that the page where the sensitive code is located is a shadow stack page having an executable permission. The shadow stack page in the Intel CET technology is a read-only dirty page, and properties of its page table entries are shown in FIG. 5: dirty bit D is set to 1, and read/write bit R/W is set to 0. Because the NX bit (used for indicating whether the page is a non-executable page, where 0 represents an executable page, and 1 represents a non-executable page) is separated from the read/write bit and the dirty bit in the page table entry, the NX bit in the page table entry corresponding to the page where the code cache is located can be set to 0, making the page where the code cache is located a shadow stack page having an executable permission.

Figure 6:
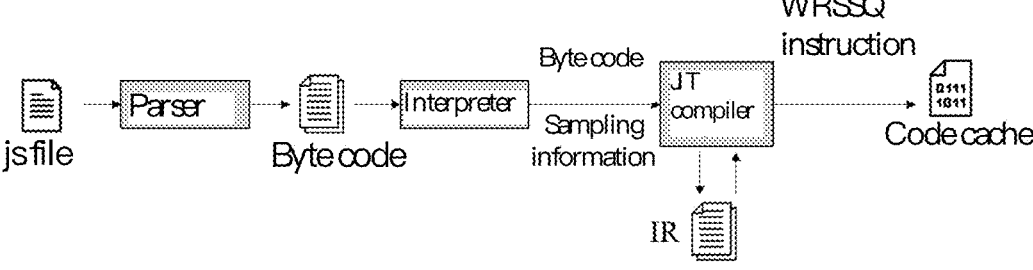
FIG. 6 shows modifying a JIT compiler of a Chakra engine to execute a protection process for sensitive code by using a protection mechanism of the present disclosure according to an embodiment of the present disclosure.

According to an example of the present disclosure, the present disclosure is deployed on a Chakra engine as an example. The Chakra engine is a JavaScript engine developed by Microsoft for a Microsoft Edge browser. The Chakra engine compiles scripts on an independent CPU core in real time, parallel to the browser. The Chakra engine calls a write permission of a switch code buffer region through the mprotect( ) system before and after generating a code buffer region, so as not to have both writable and executable permissions. Because the buffer caches the machine code generated by the JIT compiler and the page where the machine code is located is readable and writable, attackers may indirectly tamper with the code cache by tampering the buffer in the Chakra engine. In order to resist attacks against the buffer, the Chakra engine strengthens protection on the buffer. As shown in FIG. 4, when the JIT compiler of the Chakra engine compiles each piece of IR into machine code and stores the machine code in the buffer, the JIT compiler calculates a checksum (Checksum) byte by byte for the machine code. After the memcpy( ) operation, the JIT compiler recalculates the checksum byte by byte for the machine code in the code cache and compares the calculated checksum with the previous checksum. Only after passing, the machine code in the code cache can be used, otherwise an error is reported. However, this method will incur significant performance overhead. To solve this problem, according to an embodiment of the present disclosure, as shown in FIG. 6, the JIT compiler of the Chakra engine is modified in the present disclosure to set the page where the code cache storing sensitive code is located as an executable dedicated shadow stack page. Meanwhile, the original buffer and check process of the Chakra engine are abandoned, and the compiled machine code is directly written into the code cache by using a WRSSQ instruction. However, the code snippet generated by the JIT compiler each time has a different length and is usually short. Because the WRSSQ instruction must write 8 bytes to a destination address aligned with the 8 bytes each time, the WRSSQ instruction is executed multiple times when continuously generated small-byte data is written to the code cache. For example, if the JIT compiler continuously generates 4 bytes/2 bytes/2 bytes of code, sequential write to the code cache requires the following operations (it is assumed that the destination address of the 4-byte code is 0x1000, where the address is 8-byte aligned):

① 4 bytes are read from a memory at an address 0x1004 and concatenated with 4-byte code to be written, and then the 8-byte content is written into the code cache at the address 0x1000 by using the WRSSQ instruction;

② 4 bytes and 2 bytes are read from 0x1000 and 0x1006 respectively and concatenated with 2 bytes to be written, and then the 8-byte content is written into the code cache at the address 0x1000 by using the WRSSQ instruction;

③ 6 bytes are read from 0x1000 and concatenated with 2 bytes to be written, and then the 8-byte content is written into the code cache at the address 0x1000 by using the WRSSQ instruction.

Figure 7:
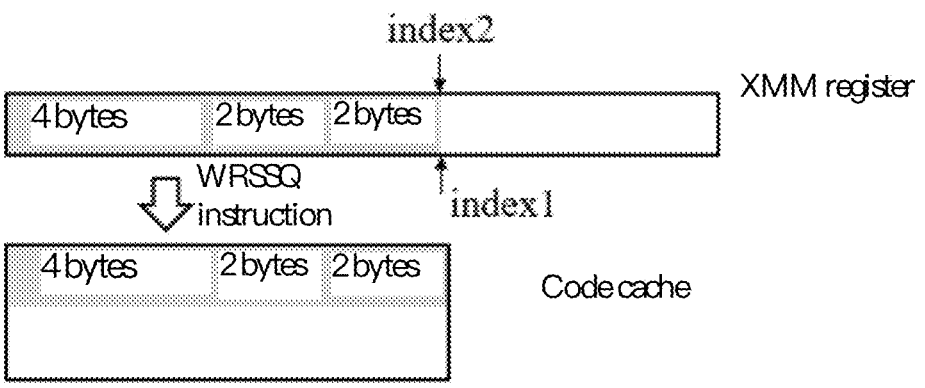
FIG. 7 is a schematic diagram of temporarily saving content to be written in a reserved register and waiting for the saving of other content to be written that has a data volume less than a predetermined threshold according to an embodiment of the present disclosure.

The above written operation requires 3 executions of the WRSSQ instruction. In order to further improve performance, the present disclosure proposes a register-as-buffer (Register-as-buffer) technology. According to an example of the present disclosure, as shown in FIG. 7, in the present disclosure, a register is used as a buffer to temporarily store short code snippets in an XMM register (the register may be set by CETIS to reserve and is only used for storing code snippets). When the content in the register reaches 8 bytes, the code snippets are written into the code cache by using the WRSSQ instruction. A first index marker index1 is used to point to the code that has not been submitted to the code cache, and a second index marker index2 is used to mark the current writable location, thereby achieving orderly submission of the code snippets. In this example, the register-as-buffer technology can change the number of executions of the WRSSQ instruction from 3 to 1, thereby greatly reducing the number of executions of the WRSSQ instruction and improving the performance of CETIS. In order to ensure consistency between the XMM register and the memory, a refresh operation is required before the content in the code cache is read to synchronize the content in the XMM register to the memory. Moreover, in addition to using the XMM register as a buffer register, other general-purpose registers such as % R14 and % R15 may also be used as buffer registers. The technical solution of this embodiment can achieve at least the following beneficial technical effect: because the present disclosure does not require calculating the checksum, checking the checksum, and performing memcpy operations, the efficiency of protecting the integrity of the code cache is improved.

According to an embodiment of the present disclosure, an Intel CET mechanism-based method for protecting the security of a program is provided, including: obtaining the source code of the program; and compiling the source code by using a compiler to protect the integrity of sensitive data and/or sensitive code according to the Intel CET mechanism-based method for protecting the integrity of a general-purpose memory when the program is executed. Preferably, the step of compiling the source code of the program by using the compiler comprises: inserting corresponding protection logic code according to information about sensitive data and/or sensitive code that needs to be protected in the source code of the program, so as to protect the integrity of sensitive data and/or sensitive code through the corresponding protection logic code according to the Intel CET mechanism-based method for protecting the integrity of a general-purpose memory when the compiled program is executed. Preferably, the information about sensitive data and/or sensitive code that needs to be protected may be specified pointers or pointer ranges of the sensitive data and/or sensitive code, and the compiler inserts the corresponding protection logic code into the program according to the pointers or pointer ranges of the sensitive data and/or sensitive code. Alternatively, the source code of the program may have protection logic code corresponding to an original protection mechanism. In this case, the logic code corresponding to the original protection mechanism records the information about sensitive data and/or sensitive code that need to be protected. Preferably, the Intel CET mechanism-based method for protecting the security of a program comprises: according to logic code corresponding to the original protection mechanism (such as CPI or CFIXX) that protects sensitive data and/or sensitive code in the source code of the program, inserting corresponding protection logic code and deleting the logic code corresponding to the original protection mechanism, so as to protect the integrity of sensitive data and/or sensitive code through the corresponding protection logic code according to the Intel CET mechanism-based method for protecting the integrity of a general-purpose memory when the compiled program is executed.

Generally, compared to the existing technologies, the present disclosure achieves integrity protection for sensitive data and/or sensitive code with lower memory-access overhead through the CET mechanism, and adopts overhead reduction processing for content with a large data volume to further improve memory-access performance and reduce memory-access overhead.

It should be noted that the steps are described in a specific order above, but it does not mean that the steps must be executed in the specific order. In fact, some of these steps can be executed concurrently, or even in a different order, as long as the required function can be achieved.

The present disclosure may be a system, method, and/or computer program product. The computer program product may comprise a computer-readable storage medium carrying computer-readable program instructions that enable a processor to implement various aspects of the present disclosure.

The computer-readable storage medium may be a tangible device that holds and stores instructions used by an instruction execution device. The computer-readable storage medium may comprise, but is not limited to, an electrical storage device, a magnetic storage device, an optical storage device, an electromagnetic storage device, a semiconductor storage device, or any suitable combination of the above. More specific examples of the computer-readable storage medium (non-exhaustive list) comprise: a portable computer disk, a hard disk, a random access memory (RAM), a read-only memory (ROM), an erasable programmable read-only memory (EPROM or flash), a static random access memory (SRAM), a portable compressed disk read-only memory (CD-ROM), a digital multifunctional disk (DVD), a memory stick, a floppy disk, a mechanical encoding device, a punched card or groove raised structure that stores instructions, or any suitable combination of the above.

The embodiments of the present disclosure are described above, and the descriptions are exemplary but not exhaustive and are not limited to the disclosed embodiments. Many modifications and alterations are apparent to those of ordinary skill in the art without departing from the scope and spirit of the described embodiments. The selection of the terms used herein aims to best explain the principles, practical applications, or market technology improvements of the embodiments, or to enable other ordinary technical personnel in the art to understand the embodiments disclosed herein.

What is claimed is:

1. A Control-Flow Enforcement Technology (CET) mechanism-based method for protecting an integrity of a general-purpose memory, comprising:
    S1. setting a page where sensitive data and/or sensitive code that needs to be protected are located as a dedicated shadow stack page when a program is executed, wherein the dedicated shadow stack page is independent of a shadow stack page maintained by a CET mechanism;
    S2. writing content to be written into the dedicated shadow stack page via a Write to Shadow Stack (WRSS) instruction of the CET mechanism; and
    S3. protecting an integrity of the sensitive data and/or sensitive code by using the dedicated shadow stack page.

2. The method according to claim 1, wherein in step S2, when a data volume of the content to be written is greater than a predetermined threshold, the content to be written is subjected to an overhead reduction processing before it is written into the dedicated shadow stack page via the WRSS instruction of the CET mechanism; or
    when the data volume of the content to be written is less than or equal to the predetermined threshold, the content to be written is temporarily saved into a reserved register until a total data volume of the content to be written in the reserved register is equal to the predetermined threshold, and then the data in the reserved register is written into the dedicated shadow stack page via the WRSS instruction.

3. The method according to claim 2, wherein in step S2, lossless compression of the content to be written is performed to achieve the overhead reduction processing.

4. The method according to claim 3, wherein the predetermined threshold is 8 bytes or 4 bytes.

5. The method according to claim 4, wherein
    the content to be written comprises metadata of a sensitive pointer, and the metadata of the sensitive pointer comprises a value of the sensitive pointer and upper and lower bounds of an object pointed to by the sensitive pointer; and
    steps of performing lossless compression of the content to be written that has the data volume greater than the predetermined threshold and comprises the metadata of the sensitive pointer comprise: calculating a first difference and a second difference according to the metadata of the sensitive pointer, wherein the first difference is a difference obtained by subtracting the lower bound of the object pointed to by the sensitive pointer from the value of the sensitive pointer, and the second difference is a difference obtained by subtracting the value of the sensitive pointer from the upper bound of the object pointed to by the sensitive pointer; and saving the value of the sensitive pointer, the first difference, and the second difference by using a plurality of bits that are not used by an addressing process and a plurality of bits that are used by the addressing process in an address space.

6. The method according to claim 5, wherein
    in step S2, when the content to be written comprises the metadata of the sensitive pointer and its data volume is greater than the predetermined threshold, after the overhead reduction processing is performed on the content to be written, the content to be written is written into the dedicated shadow stack page by using the WRSS instruction of the CET mechanism in a following way: writing the value of the sensitive pointer, the first difference, and the second difference into specified bits in the dedicated shadow stack page based on a class of the sensitive pointer and a data writing rule corresponding to the class, and using the corresponding bits that are not used by the addressing process in the address space as extend class indicator bits for recording the class of the sensitive pointer.

7. The method according to claim 4, wherein the content to be written comprises a metadata table for backing up a virtual table pointer.

8. The method according to claim 7, wherein in step S3, before a corresponding pointer saved in an ordinary memory is dereferenced, determining whether the dereference is secure according to the metadata of the sensitive pointer backed up for the pointer and stored in the dedicated shadow stack page; or
    before a target function is directly called according to a corresponding virtual table pointer saved in the ordinary memory, the virtual table pointer is compared with the virtual table pointer recorded in the metadata table in the dedicated shadow stack page to determine whether an indirect call is secure.

9. The method according to claim 4, wherein the content to be written is a machine code generated by a Just-In-Time (JIT) compiler, and the machine code is sensitive code.

10. A Control-Flow Enforcement Technology (CET) mechanism-based method for protecting the security of a program, comprising:
    obtaining a source code of the program; and
    compiling the source code by using a compiler to protect the integrity of sensitive data and/or sensitive code in the program according to the method described in claim 1 when the program is executed.

11. The CET mechanism-based method for protecting the security of a program according to claim 10, wherein the step of compiling the source code by using the compiler comprises:
    inserting a corresponding protection logic code according to information about sensitive data and/or sensitive code that need to be protected in the source code of the program, so as to protect the integrity of the sensitive data and/or sensitive code through the corresponding protection logic code according to the method in claim 1 when the compiled program is executed.

12. An electronic device, comprising:

one or more processors; and a memory, wherein the memory is configured to store executable instructions; and the one or more processors are configured to implement the method in claim 1 by executing the executable instructions.

\*    \*    \*    \*    \*